(12) United States Patent
Butz et al.

(10) Patent No.: US 10,308,231 B2
(45) Date of Patent: Jun. 4, 2019

(54) METHOD FOR OPERATING A BRAKE BOOSTER, CONTROL DEVICE FOR CARRYING OUT THE METHOD, AND A BRAKE SYSTEM COMPRISING THE BRAKE BOOSTER AND THE CONTROL DEVICE

(71) Applicant: Robert Bosch GmbH, Stuttgart (DE)

(72) Inventors: Michael Butz, Bietigheim-Bissingen (DE); Manfred Gerdes, Vaihingen/Enz (DE); Patrick Christian Schaefer, Ludwigsburg (DE); Herbert Vollert, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 540 days.

(21) Appl. No.: 14/915,243

(22) PCT Filed: Jul. 24, 2014

(86) PCT No.: PCT/EP2014/065928
§ 371 (c)(1),
(2) Date: Feb. 28, 2016

(87) PCT Pub. No.: WO2015/036156
PCT Pub. Date: Mar. 19, 2015

(65) Prior Publication Data
US 2016/0200306 A1    Jul. 14, 2016

(30) Foreign Application Priority Data

Sep. 12, 2013 (DE) .................. 10 2013 218 330

(51) Int. Cl.
G06F 7/70    (2006.01)
G06F 19/00   (2018.01)
(Continued)

(52) U.S. Cl.
CPC .......... *B60T 13/745* (2013.01); *B60T 13/662* (2013.01)

(58) Field of Classification Search
CPC combination set(s) only.
See application file for complete search history.

(56) References Cited

U.S. PATENT DOCUMENTS 5,330,259 A * 7/1994 Ravndal ................ B60T 8/346
                                                  303/115.4
5,842,751 A * 12/1998 Unterforsthuber ..... B60T 8/442
                                                  303/115.3
(Continued)

FOREIGN PATENT DOCUMENTS

CN    102387949 A    3/2012
CN    102405164 A    4/2012
(Continued)

OTHER PUBLICATIONS

International Search Report for PCT/EP2014/065928, dated Jan. 22, 2015.

*Primary Examiner* — Bhavesh V Amin
(74) *Attorney, Agent, or Firm* — Norton Rose Fulbright US LLP; Gerard Messina

(57) ABSTRACT

A method for controlling a brake booster in a hydraulic brake system, in which the smallest partial pressure target value of at least three partial pressure target values is ascertained, and is then defined as the target pressure value and is then set using a brake booster.

16 Claims, 3 Drawing Sheets

(51) Int. Cl.
*B60T 13/74* (2006.01)
*B60T 13/66* (2006.01)

(56) References Cited

U.S. PATENT DOCUMENTS

| | | | | |
|---|---|---|---|---|
| 6,033,038 | A * | 3/2000 | Kulkarni | B60T 8/442 303/113.3 |
| 6,283,559 | B1 * | 9/2001 | Yamada | B60T 13/46 303/113.3 |
| 6,347,608 | B1 * | 2/2002 | Hara | F02N 11/084 123/179.4 |
| 6,412,881 | B1 * | 7/2002 | Isono | B60T 8/367 188/356 |
| 6,418,716 | B1 * | 7/2002 | Matsuno | B60T 7/22 60/545 |
| 6,715,846 | B1 * | 4/2004 | Pueschel | B60T 8/442 303/114.1 |
| 7,040,719 | B2 * | 5/2006 | Collins | B60T 13/72 303/114.3 |
| 7,686,404 | B2 * | 3/2010 | Lehmann | B60T 8/3275 303/114.3 |
| 7,832,261 | B2 * | 11/2010 | Kaestner | B60T 13/52 73/121 |
| 7,930,087 | B2 * | 4/2011 | Gibson | F02D 13/04 123/321 |
| 7,938,493 | B2 * | 5/2011 | Miyazaki | B60T 8/4063 303/11 |
| 8,038,228 | B2 * | 10/2011 | Gronau | B60T 8/442 303/113.3 |
| 8,287,055 | B2 * | 10/2012 | Lee | B60T 8/172 303/15 |
| 8,343,011 | B2 * | 1/2013 | Cunningham | B60T 13/72 477/206 |
| 8,382,642 | B2 * | 2/2013 | Saito | B60W 10/06 477/185 |
| 8,498,802 | B2 * | 7/2013 | Yamamoto | F02D 29/02 701/112 |
| 8,622,179 | B2 * | 1/2014 | Watanabe | B60T 7/042 188/1.11 E |
| 8,745,980 | B2 * | 6/2014 | Shimada | B60T 13/662 123/325 |
| 8,958,954 | B2 * | 2/2015 | Bunker | B60R 21/0132 701/45 |
| 2002/0020172 | A1 * | 2/2002 | Matsuno | B60T 7/22 60/562 |
| 2002/0028726 | A1 * | 3/2002 | Morimoto | F02D 17/04 477/102 |
| 2005/0218716 | A1 * | 10/2005 | Collins | B60T 13/72 303/115.3 |
| 2006/0066146 | A1 * | 3/2006 | Otomo | B60T 8/26 303/151 |
| 2008/0041336 | A1 * | 2/2008 | Gibson | F02D 13/04 123/322 |
| 2010/0270855 | A1 * | 10/2010 | Sawada | B60T 8/1764 303/113.2 |
| 2011/0037310 | A1 * | 2/2011 | Knechtges | B60T 8/1766 303/9.62 |
| 2011/0082624 | A1 * | 4/2011 | Yamamoto | F02D 29/02 701/41 |
| 2011/0100013 | A1 * | 5/2011 | Whitney | F02D 41/0005 60/706 |
| 2011/0183812 | A1 * | 7/2011 | Cunningham | B60T 13/72 477/183 |
| 2011/0215638 | A1 * | 9/2011 | Sakuma | B60T 13/16 303/11 |
| 2011/0256980 | A1 * | 10/2011 | Saito | B60W 10/06 477/183 |
| 2012/0049615 | A1 * | 3/2012 | Tomida | B60T 13/20 303/4 |
| 2012/0074770 | A1 * | 3/2012 | Lee | B60T 8/172 303/20 |
| 2013/0079994 | A1 * | 3/2013 | Bunker | B60R 21/0132 701/45 |
| 2013/0123067 | A1 * | 5/2013 | Cunningham | B60T 13/72 477/206 |
| 2014/0014451 | A1 * | 1/2014 | Nakata | B60T 1/10 188/358 |
| 2014/0265543 | A1 * | 9/2014 | Joyce | B60T 7/042 303/6.01 |
| 2015/0008726 | A1 * | 1/2015 | Minami | B60T 8/885 303/14 |
| 2015/0051805 | A1 * | 2/2015 | Mayer | B60T 8/4072 701/70 |
| 2016/0159333 | A1 * | 6/2016 | Svensson | B60T 11/20 701/70 |
| 2016/0200306 | A1 * | 7/2016 | Butz | B60T 13/662 60/545 |

FOREIGN PATENT DOCUMENTS

| | | |
|---|---|---|
| CN | 102933439 A | 2/2013 |
| DE | 10124593 | 1/2002 |
| DE | 10324959 | 12/2004 |
| DE | 202010017605 | 10/2012 |
| JP | 2004291778 A | 10/2004 |
| JP | 2009274684 A | 11/2009 |
| JP | 2011063170 A | 3/2011 |
| JP | 2011093435 A | 5/2011 |
| JP | 2013166521 A | 8/2013 |

* cited by examiner ured and controlled drive of the motor, the brake booster can be very quickly adapted to the current brake situation, and the current brake situation can be taken into account.

METHOD FOR OPERATING A BRAKE BOOSTER, CONTROL DEVICE FOR CARRYING OUT THE METHOD, AND A BRAKE SYSTEM COMPRISING THE BRAKE BOOSTER AND THE CONTROL DEVICE

BACKGROUND INFORMATION

German Patent Application DE 20 2010 017 605 U1 describes a brake booster, as well as a method and a device for its operation. For the controlling/regulation of the brake booster, a control device is described that controls the brake booster on the basis of signals of a sensor device for ascertaining a displacement path of an input rod, and on the basis of signals of a motor of the brake booster. Optionally, signals of a difference path sensor for determining a relative deflection between the input rod and a booster body, or of a force sensor for determining a driver's applied force, can also be evaluated by the control device.

In driving situations with braking, it can happen that excessively high pressures occur in the brake system due to the simultaneous buildup of brake pressure from the driver, the brake booster, and the recirculation of the ABS/ESP recirculation pump. These high pressures impair the brake pedal haptic feedback, and unnecessarily load the brake system. This is irritating to the driver, because the driver is not accustomed to this deviation. An object of a method according to the present invention is to control the pressure in the brake system in a manner appropriate to the situation in the case of an ABS regulation, i.e., if the ABS/ESP recirculation pump can recirculate large volumes, in such a way that the brake pedal haptic feedback is perceived as pleasant, the brake performance (minimum possible brake path) can be ensured, and the load on the brake system is as small as possible so as not to overload the brake system components.

The core of the present invention is the ascertaining of the necessary pressure target values in the brake system on the basis of the current driver behavior, the state of the brake apparatus, and the roadway surface, as well as further characteristic values of the driving situation, e.g., the vehicle speed. The target pressure value ascertained in this way is set using an electronic brake booster. In this way, the load on the brake system is limited in a manner appropriate to the situation.

SUMMARY

The present invention relates to a method for controlling a brake booster in a hydraulic brake system, having a plurality of steps.

A smallest partial pressure target value is selected from at least three partial pressure target values. The smallest partial pressure target value is thereupon determined as the target pressure value for the brake system. The brake booster is controlled in order to set the target pressure value using the brake booster. On the basis of the different partial pressure target values, a respective partial pressure target value can be queried from different regions of the brake system, and in this way the current operating situation of the brake system can be acquired. The selection of the smallest of these present request values, and controlling of the brake booster in order to set this value as target pressure value, enables an operation of the brake system that minimizes material wear and does not present the driver with an unexpected feeling.

In an advantageous embodiment of the method, the first partial pressure target value is ascertained as a function of a wheel brake pressure, the second partial pressure target value is ascertained as a function of the actuation of the brake apparatus by the driver, and the third partial pressure target value is ascertained as a function of the vehicle speed. Because, as described above, the partial pressure target values represent the current situation of the brake system, it is advantageous to take into account properties of the current operating state, such as the type of actuation by the driver, or the prevailing wheel brake pressure, in the determination of the target values.

In an example embodiment of the method according to the present invention, the target pressure value ascertained in this way is compared to the pressure currently prevailing in the brake system. The pressure difference ascertained from the comparison between the target pressure value and the prevailing pressure is corrected by regulation in the context of the example method according to the present invention. In this way, it can advantageously be determined how far the ascertained target pressure value is from the pressure value currently prevailing in the brake system. In this way, a regulating quantity for the method is defined.

In addition, it may be advantageous if the pressure difference is corrected by modifying the boosting of the brake booster, in the form of an adaptation of the target rotational speed of a motor of the brake booster, or through adaptation of the motor torque of the motor of the brake booster. In this way, the brake booster compensates the ascertained pressure difference.

Advantageously, the target rotational speed of the motor (303) is ascertained as a function of the pressure difference, and is limited to a limited motor speed by a limit for the motor rotational speed. Through such a limitation, it is avoided that the brake booster is operated with an excessively high motor speed. This is a safety measure for the brake booster, and prevents negative effects on the pedal feeling experienced by the driver.

In addition, it is advantageous that before controlling the motor of the brake booster with the limited motor rotational speed, it is checked whether a controlling is to be carried out with the limited motor speed or with the motor speed specified by the driver through the brake pedal actuation. This prevents there taking place an adaptation of the motor speed of the brake booster specified by the driver through the brake actuation in the direction of the limited motor speed when this is no longer necessary in the situation.

In an advantageous embodiment, the check takes place on the basis of the prevailing pressure in the brake system, on the basis of the brake actuation by the driver, and on the basis of the presence of a brake pressure modulation by a brake pressure modulation unit. This has the advantage that the current brake situation is again queried, and in this way the impending regulation of the motor speed is again plausibilized. This again ensures increased safety of the brake system.

Advantageously, the selection of the first, second, and third partial pressure target values is made from an identical pressure range between maximum pressure and minimum pressure of the brake system. Thus, for all three partial brake values it is ensured that a permissible range of pressure values cannot be departed from due to the regulation of the brake booster.

Advantageously, the first partial brake pressure target value is ascertained as a function of a wheel brake pressure using a signal of a wheel brake modulation unit, the signal corresponding to the highest of the currently present wheel brake pressure values of wheel brakes of the brake system connected to the brake system. Through this signal forwarding, the current brake situation is adequately forwarded to the control device of the brake booster.

In addition, the ascertaining of the first partial brake pressure target value includes a filtering and an offset charging, thus ensuring that a sufficiently high pressure is always present in the brake system.

In addition, the partial brake pressure target values are taken from characteristic maps, on the basis of input quantities ($v_{vehicle}$, $p_{Estmax}$, DRR), or are calculated using equations.

The present invention also relates to a control device for carrying out the example method according to the present invention.

The brake system according to the present invention includes a brake booster that is operated using the method according to the present invention, and a control device for carrying out the method.

DETAILED DESCRIPTION OF EXAMPLE EMBODIMENTS

In a specific embodiment of the present invention, the brake system includes a control unit 1 and a brake pressure modulation unit 2. Control unit 1 controls and/or regulates brake booster 308 of the brake system.

Figure 3:
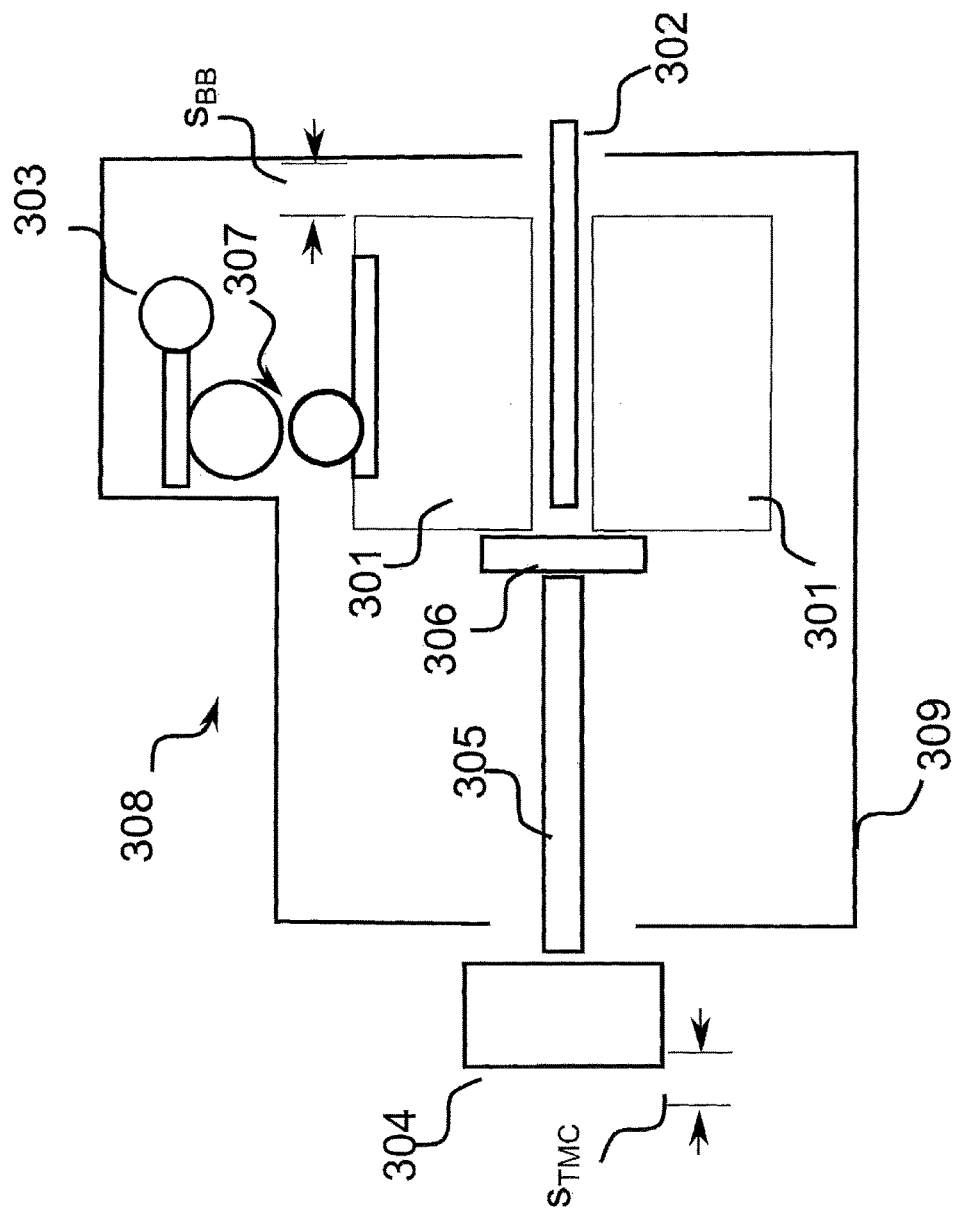
FIG. 3 shows a schematic representation of a brake booster.

FIG. 3 schematically shows an electromechanical brake booster 308. Via an output rod 305, the brake booster charges a master brake cylinder 304, more precisely an input piston of master brake cylinder 304, with a force, in order to build up a pressure in a hydraulic brake system in a conventional manner.

For this purpose, a reaction disc 306 is situated between output rod 305 of brake booster 308 on the one hand and a booster body 301 as well as an input rod 302 on the other hand. Via input rod 302, the driver can transmit a force to output rod 305 via reaction disc 306. The booster body can be displaced translationally by a motor 303 via a gear mechanism 307 that converts the rotation of the motor. Gear mechanism 307 is a rotation-translation-conversion gear mechanism. In this way, booster body 301 can be moved by motor 303 via gear mechanism 307, and this body can likewise charge output rod 305 with force via reaction disc 306.

The displacement of booster body 301 relative to booster housing 309 is shown as quantity $s_{BB}$. The deflection of input rod 302 from its rest position is shown as quantity $s_{IR}$.

Brake booster 308 is regulated as a function of various quantities that are described below. Here, the description takes place in steps with the associated components of control unit 1.

In order to cover the pressure requirement needed in the brake system, a closed loop controlling is used. For this purpose, a pressure sensor signal is used that corresponds to a measured pressure in the brake system. This signal can be supplied to the system directly and/or indirectly. Thus, the pressure sensor signal can be provided directly through installation of a pressure sensor in brake pressure modulation unit 2, but it is also possible for it to be provided by a separately installed pressure sensor that provides the pressure sensor signal via a data line.

Likewise, the pressure sensor signal can be derived from other quantities, for example from load-relevant quantities such as the motor torque of the drive motor of brake booster 308.

Figure 1:
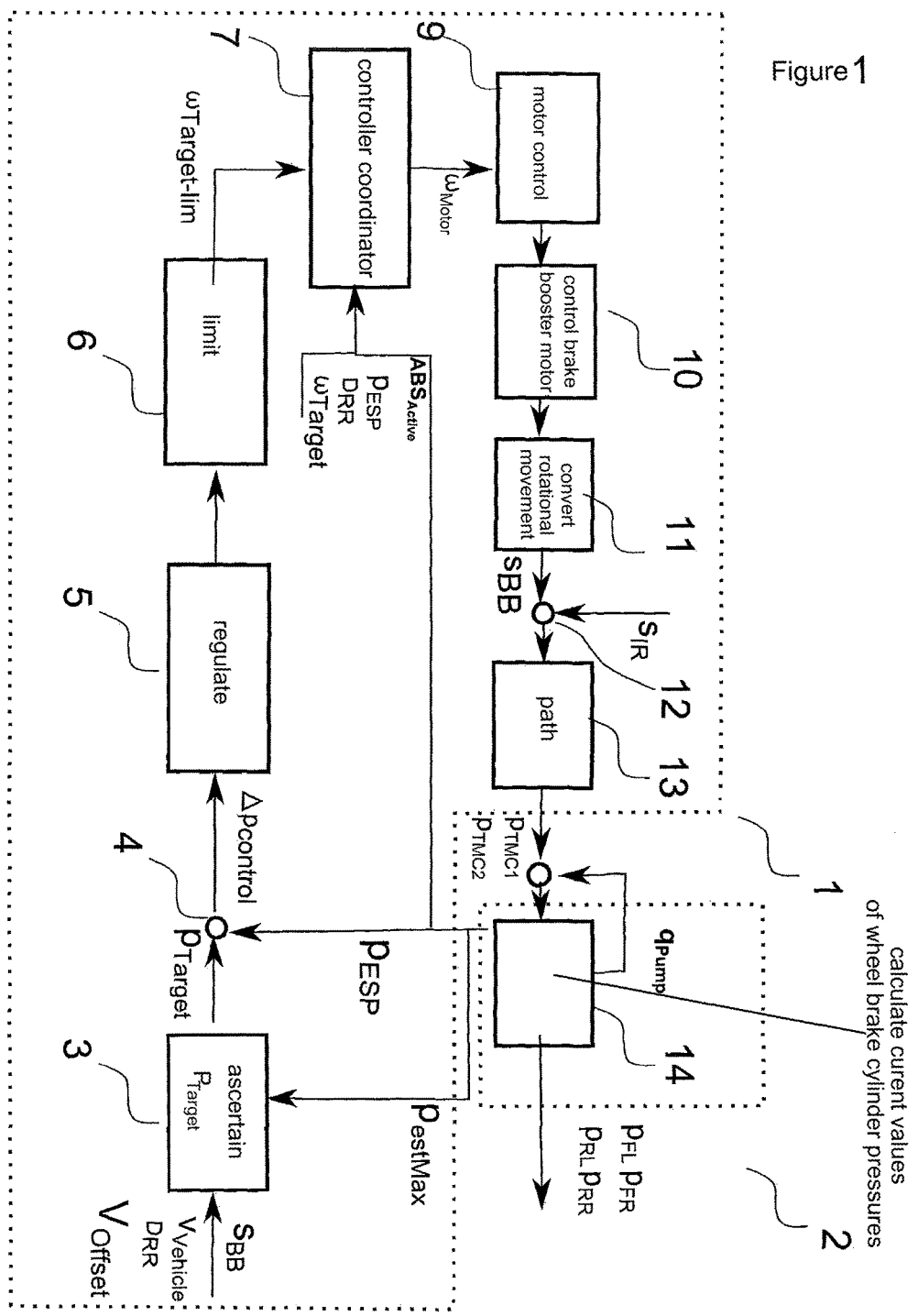
FIG. 1 shows a flow diagram of the method according to the present invention for regulating a brake booster.

FIG. 1 shows how, starting from brake pressure modulation unit 2, for example a conventional ESP system, a pressure sensor signal $p_{ESP}$ is forwarded to control unit 2 of the brake booster.

This pressure sensor signal $p_{ESP}$ is now used to control brake booster 308. Here, the brake boosting of the brake booster is modified in such a way that the current actually present pressure in the brake system is adapted to the ascertained brake pressure requirement $p_{Target}$.

For this purpose, for example the path $s_{BB}$ of booster body 301 (also called boost body) of brake booster 308 is displaced with a specifiable rotational speed $\omega_{Motor}$ via the motor controlling using motor 303 of brake booster 308.

In a first part 3 of the control method, the ascertaining of target pressure $p_{Target}$ takes place. Target pressure $p_{Target}$ corresponds to the currently present pressure requirement of the brake system that is to be set using brake booster 308. This pressure requirement is a function of, inter alia:

the driver's behavior 202, i.e. whether the driver is actuating the brake pedal cautiously or strongly, with high force and/or speed;

the roadway friction value 203 (gripping or smooth roadway)

vehicle speed 201 (high speed versus standstill).

This is described in more detail with reference to FIG. 2.

Figure 2:
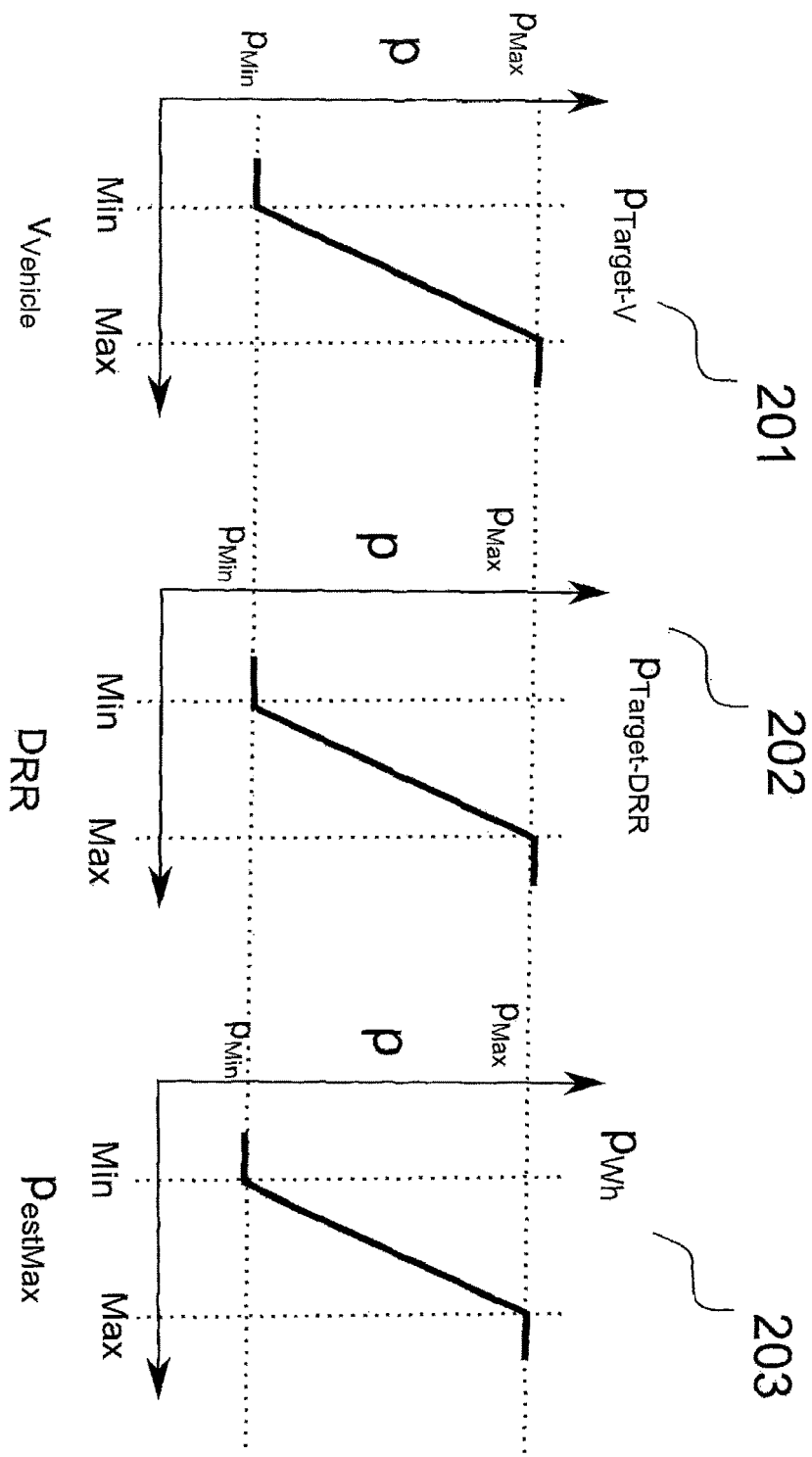
FIG. 2 shows the determination of partial pressure target values that enter into the regulation of the brake booster.

FIG. 2 shows a part of the calculation of pressure requirement $p_{Target}$.

A partial pressure target value is ascertained for each of the listed criteria driver's behavior 202, roadway friction value 203, and vehicle speed 201. The value for the respective partial pressure target value is between a minimum pressure requirement ($p_{Min}$) and a maximum pressure requirement ($p_{Max}$) for the driver's desired braking, the roadway friction value, and the vehicle speed. The actual selection of the respective partial pressure target value can take place via characteristic maps or also via equations, in particular linear equations.

The driver-dependent partial pressure target value $p_{Target-DRR}$ is ascertained on the basis of a path difference DRR (see FIG. 3) between an input rod path $S_{IR}$ and the path (ascertained by computation from the measured angle of rotation of the motor of the brake booster) of booster body $s_{BB}$ in the brake booster (DRR=Driver Brake Request Recognition). This is therefore the path difference between the input rod path and the booster path.

If this path difference is small, then a small partial pressure target value $p_{Target-DRR}$ is assumed, and if the path difference is large a larger partial pressure target value $p_{Target-DRR}$ is assumed. The choice of the partial pressure target value $p_{Target-DRR}$ corresponding to the path difference takes place via characteristic maps or also via equations, in particular linear equations. The path difference is a measure for the actuation of the brake by the driver. The partial pressure target value $p_{Target-Wh}$, which is a function of the roadway friction value, is ascertained on the basis of estimated or measured quantities on the basis of wheel brake cylinder pressures $p_{RR}$, $p_{RL}$, $p_{FR}$, and $p_{FL}$ of the connected wheel brakes, corresponding to the four wheel brake cylinders of a vehicle. On the one hand, this is possible on the basis of a signal $p_{EstMax}$ of pressure modulation unit 2. This value corresponds to the maximum pressure, present at each sampling time of the data transmission between pressure modulation unit 2 and control unit 1, of the four brake pressures $p_{RR}$, $p_{RL}$, $p_{FR}$, and $p_{FL}$ of the connected wheel brakes. Brake pressure modulation unit 2 ascertains the maximum pressure of the connected wheel brakes and transmits this to control unit 1. A corresponding partial pressure target value $p_{Wh}$ can then be assigned to pressure value $p_{EstMax}$. The actual selection of the respective partial pressure target value can take place via characteristic maps or via equations, in particular linear equations.

Alternatively, a value corresponding to $p_{EstMax}$ can also be ascertained by computation on the basis of constructive and internal quantities of brake booster 308. For this purpose, a partial volume is ascertained by multiplying the displacement path of brake booster $s_{BB}$ by the effective pressure surface of master brake cylinder 304. This partial volume is additively linked to the dead volume $V_{offset}$ of the brake system. On the basis of the known pressure/volume characteristic curve of the brake system, a pressure value can then in turn be determined to which a partial pressure target value $p_{Wh}$ is assigned, analogous to the case of $p_{EstMax}$.

In a further step, the partial pressure target value $p_{Wh}$ ascertained in one of these ways, which is a function of the roadway frictional value, is filtered, and is increased using an offset boost. After this step, a corrected value for the partial pressure target value $p_{Target\text{-}wh}$ is then present. The increase ensures that in each case (even in case of error) the pressure is large enough to enable braking with maximum safety.

In real-world travel situations in street traffic, high wheel brake cylinder pressures are relatively rare; in the normally occurring gentle brakings, only low pressures are realized. In the case of ABS regulations to a low friction value, which last a relatively long time and can thus in part produce high loads, again only a low wheel brake cylinder pressure is ascertained. As a result, a small pressure requirement can be specified for the brake system. Only for the case of a high friction value does a very high pressure have to be provided for the ABS.

For low vehicle speeds $v_{vehicle}$ close to standstill Min, the partial pressure requirement $p_{Target\text{-}v}$ of the brake apparatus is occupied with small values. In this way the load during the vehicle standstill, which must last a long time (e.g., in a traffic jam) is reduced for the entire brake system. At higher speeds $v_{vehicle}$ greater than Max, the pressure requirement is set to the maximum value. Further special cases can also be considered in order to provide supplementary definition of the pressure requirement of the brake system here.

For all three criteria, the same parametrization is specified of the minimum and maximum allowable partial pressure target values ($p_{min}$ or $p_{max}$).

From the present partial pressure requirement values $p_{Target\text{-}V}$, $p_{Target\text{-}Wh}$, and $p_{Target\text{-}DRR}$, using a minimum selection the smallest partial pressure requirement is selected as target value $p_{Target}$ for the pressure regulation.

The signals are linked as logical AND. The highest pressure in the brake system is necessary only if the driver is energetically actuating the brake ($D_{RR}$>Max) AND the roadway has a high friction value ($p_{Estmax}$>Max) AND the vehicle speed is high enough ($v_{Vehicle}$>Max). Expressed differently, a low pressure can be sufficient if for example the driver is only lightly actuating the brake OR the friction value of the roadway is low OR the vehicle is standing still. This comparison result $p_{Target}$ is used for the further setting of the brake booster. In this way, the pressure to be set in the brake system is defined.

The goal of the regulation is the setting of the pressure $p_{Target}$ via a deliberate variation of the supporting of the brake force by the brake booster. This takes place via a targeted retraction of the path or of the force of the brake force support element in the form of the motor torque of motor 303 of the brake booster.

In a following step 4 of the depicted exemplary embodiment, for this purpose the pressure requirement of the brake apparatus, derived as target pressure $p_{Target}$ in step 3, is subtracted from the prevailing actual pressure $p_{ESP}$, and in this way a difference pressure signal $\Delta p_{Control}$ is produced. This difference pressure signal $\Delta p_{Control}$ is supplied to a regulating algorithm 5 (pressure controller, e.g., a PID regulator), which in the present exemplary embodiment ascertains and outputs as output signal a motor speed that is to be set of the motor of the brake booster.

In the following step 6 (limitation), this target motor speed of the motor of the brake booster is limited and is outputted as $\omega_{Target\text{-}lin}$. In this way, it is ensured that the driver and the brake booster will not have to expect any excessive changes of the current operating point. This means that the currently present brake boosting must not be modified too strongly, in order not to irritate the driver. This is a safety function of the brake booster.

In the following step 7 (controller coordination) it is ensured that the now-present controlling of the electric motor of the brake booster matches the driver's behavior.

For this purpose, it is checked whether the brake is still being actuated. Quantities that enable this are the currently present difference path $D_{RR}$, as well as the target motor speed $\omega_{Target}$ that was originally specified corresponding to the driver's desired braking. From the signal of the input rod path $s_{IR}$, this original target value $\omega_{Target}$ for the motor speed is ascertained, which ensures a brake boosting for all driving situations. This takes place through calculation of the difference path DRR=$s_{BB}$−$s_{IR}$ as the difference of the booster body path $s_{BB}$ and the input rod path $s_{IR}$, and of the time derivative of the input rod path $s_{IR}$ as dynamic guide quantity in the form of a pre-control signal. In this way, the query checks the driver's desired braking using two redundant paths in order to rule out malfunction of the regulation.

In addition, it is checked whether the brake pressure modulation device, i.e., the ESP regulator, continues to be in anti-block operation ($ABS_{Active}$), and whether high pressure values continue to be present that require the pressure regulation according to the present invention ($ABS_{Active}$).

For this purpose, it is checked whether a suspect behavior of the brake system pressure $p_{ESP}$ is present, i.e., whether the pressure sensor signals show high values. This can be ascertained on the basis of the magnitude of the value $p_{ESP}$ and supplied as input quantity in step 7.

In step 7, it is decided whether all three conditions—brake still actuated, ABS active, and pressure still high—are met. If this is the case, the ascertained motor control value $\omega_{Target\text{-}lin}$ is passed through as quantity $\omega_{Target}$; otherwise the motor speed $\omega_{Target}$ specified by the driver is forwarded as $\omega_{Motor}$. In this way there takes place a plausibilization of the target rotational speed $\omega_{Motor}$ forwarded to the motor, as a function of the currently present situation.

The output signal from step 7 is $\omega_{Motor}$, the motor speed target value of brake booster motor 303. This target value is supplied to motor regulation 9 (motor control), which, on the basis of a comparison with the actual speed of the brake booster motor, controls the brake booster motor in step 10 in such a way that the motor assumes target motor speed $\omega_{Motor}$.

In step 11, the rotational movement of motor 303 is converted into a longitudinal movement of booster body 301 using gear mechanism 307 connected downstream from motor 303, causing displacement of the booster body by $s_{BB}$.

Together with the input rod path of the driver $s_{IR}$ through displacement of input rod 302, in step 13 the path $s_{TMC}$ of the master brake cylinder results mechanically via further constructive transmission elements such as reaction disc 306. The displacement of the pistons of the master brake cylinder causes, in a conventional manner, a pressure charging of the brake fluid and thus a pressure in the brake system at the two output lines of the master brake cylinder ($p_{TMC1,2}$).

Brake pressure modulation device 2 has, in a conventional manner, a recirculation pump that is active in the case of ABS operation, and that, in the case of an activity, produces an additional pressure modulation through a volume flow $q_{pump}$. The volume flow of the pump, in combination with the pressure $p_{TMC1,2}$ present at the master brake cylinder output, results in a new present pressure $p_{ESP}$ that in turn enters into the regulation.

Brake pressure modulation unit 2 measures the brake system pressure at the master brake cylinder output and makes it available, as described above, via a data line as $p_{ESP}$.

The valve circuit in the hydraulic aggregate of the brake pressure modulation device influences the behavior of the wheel brake cylinder pressures at the wheels at front left $p_{FL}$, front right $p_{FR}$, rear left $p_{RL}$ and rear right $p_{RR}$. Pressure modulation device 2 estimates or measures this effect using a suitable arrangement, calculates the current values of wheel brake cylinder pressures $p_{FL}$, $p_{FR}$, $p_{RL}$, and $p_{RR}$, and provides to the brake booster the maximum of the wheel brake cylinder pressures as signal $p_{EstMax}$ in order to ascertain, as described in step 3, the partial brake pressure requirement $p_{Target-Wh}$, which is a function of the roadway friction value.

What is claimed is:

1. A method for controlling a brake booster in a hydraulic brake system, comprising:
   ascertaining a first one of at least three partial pressure target values;
   ascertaining a second one of the at least three partial pressure target values;
   ascertaining a third one of the at least three partial pressure target values;
   ascertaining a smallest partial pressure target value from the at least three partial pressure target values;
   defining the smallest partial pressure target value as a target pressure value for the brake system; and
   controlling the brake booster to set the target pressure value using the brake booster.

2. The method as recited in claim 1, wherein the first one of the partial pressure target values is ascertained as a function of a wheel brake pressure, the second one of the partial pressure target values is ascertained as a function of actuation of a brake apparatus by a driver, and the third one of the partial pressure target values is ascertained as a function of the vehicle speed.

3. The method as recited in claim 2, wherein the target pressure value is compared to a pressure currently prevailing in the brake system, and a pressure difference between the target pressure value and the prevailing pressure is corrected by regulation.

4. A method for controlling a brake booster in a hydraulic brake system, comprising:
   ascertaining a smallest partial pressure target value from at least three partial pressure target values;
   defining the smallest partial pressure target value as a target pressure value for the brake system; and
   controlling the brake booster to set the target pressure value using the brake booster, wherein a first one of the partial pressure target values is ascertained as a function of a wheel brake pressure, a second one of the partial pressure target values is ascertained as a function of actuation of a brake apparatus by a driver, and a third one of the partial pressure target values is ascertained as a function of the vehicle speed, wherein the target pressure value is compared to a pressure currently prevailing in the brake system, and a pressure difference between the target pressure value and the prevailing pressure is corrected by regulation, and wherein the difference is corrected through regulation by modifying the boosting of the brake booster by one of: i) adapting a target rotational speed of a motor of the brake booster, or ii) adapting the motor torque of the motor of the brake booster.

5. The method as recited in claim 4, wherein the target rotational speed of the motor is ascertained as a function of the pressure difference and is limited to a limited motor speed through a limit for the motor rotational speed.

6. The method as recited in claim 5, wherein before controlling of the motor of the brake booster with the limited motor rotational speed, checking whether a controlling is to be carried out with the limited motor speed or with the motor speed specified by the brake actuation by the driver.

7. The method as recited in claim 6, wherein the check takes place on the basis of the prevailing pressure in the brake system, the brake actuation by the driver, and the presence of a brake pressure modulation by a brake pressure modulation unit.

8. The method as recited in claim 2, wherein the selection of the first, second, and third partial pressure target values takes place from an identical pressure range between maximum pressure and minimum pressure.

9. The method as recited in claim 2, wherein the first partial brake pressure target value is ascertained as a function of a wheel brake pressure using a signal of a wheel pressure modulation unit, the signal corresponding to the highest of the currently present wheel brake pressure values of wheel brakes, connected to the brake system, of the brake system.

10. A method for controlling a brake booster in a hydraulic brake system, comprising:
    ascertaining a smallest partial pressure target value from at least three partial pressure target values;
    defining the smallest partial pressure target value as a target pressure value for the brake system; and
    controlling the brake booster to set the target pressure value using the brake booster, wherein a first one of the partial pressure target values is ascertained as a function of a wheel brake pressure, a second one of the partial pressure target values is ascertained as a function of actuation of a brake apparatus by a driver, and a third one of the partial pressure target values is ascertained as a function of the vehicle speed, wherein the first partial brake pressure target value is ascertained as a function of a wheel brake pressure using a signal of a wheel pressure modulation unit, the signal corresponding to the highest of the currently present wheel brake pressure values of wheel brakes, connected to the brake system, of the brake system The method as recited in claim 9, and wherein the ascertaining of the first partial brake pressure target value includes a filtering and an offset charging.

11. The method as recited in claim 2, wherein for the ascertaining of the partial brake pressure target values, obtaining the partial brake pressure target values from characteristic maps on the basis of input quantities or calculating the partial brake pressure target values using equations.

12. A control device to control a brake booster in a hydraulic brake system, the control device configured to:
ascertain a first one of at least three partial pressure target values;
ascertain a second one of the at least three partial pressure target values;
ascertain a third one of the at least three partial pressure target values;
ascertain a smallest partial pressure target value from the at least three partial pressure target values;
define the smallest partial pressure target value as a target pressure value for the brake system; and
control the brake booster to set the target pressure value using the brake booster.

13. A brake system, comprising:
a brake booster; and a control device, the control device configured to:
ascertain a first one of at least three partial pressure target values;
ascertain a second one of the at least three partial pressure target values;
ascertain a third one of the at least three partial pressure target values;
ascertain a smallest partial pressure target value from the at least three partial pressure target values;
define the smallest partial pressure target value as a target pressure value for the brake system; and
control the brake booster to set the target pressure value using the brake booster.

14. The method as recited in claim 1, wherein:
the first one of the at least three partial pressure target values corresponds to a first region of the brake system,
the second one of the at least three partial pressure target values corresponds to a second region of the brake system, and
the third one of the at least three partial pressure target values corresponds to a third region of the brake system.

15. The control device as recited in claim 12 wherein:
the first one of the at least three partial pressure target values corresponds to a first region of the brake system,
the second one of the at least three partial pressure target values corresponds to a second region of the brake system, and
the third one of the at least three partial pressure target values corresponds to a third region of the brake system.

16. The brake system as recited in claim 13, wherein:
the first one of the at least three partial pressure target values corresponds to a first region of the brake system,
the second one of the at least three partial pressure target values corresponds to a second region of the brake system, and
the third one of the at least three partial pressure target values corresponds to a third region of the brake system.

* * * * *